United States Patent
Möller et al.

(10) Patent No.: US 7,845,171 B2
(45) Date of Patent: Dec. 7, 2010

(54) SUPERCHARGED INTERNAL COMBUSTION ENGINE WITH AN EXPANDER UNIT IN A HEAT RECOVERY CIRCUIT

(75) Inventors: Heribert Möller, Sachsen (DE); Gottfried Raah, Perg (AT)

(73) Assignee: MAN Nutzfahrzeuge AG (DE)

( * ) Notice: Subject to any disclaimer, the term of this patent is extended or adjusted under 35 U.S.C. 154(b) by 0 days.

(21) Appl. No.: 11/765,646

(22) Filed: Jun. 20, 2007

(65) Prior Publication Data

US 2008/0223040 A1  Sep. 18, 2008

(30) Foreign Application Priority Data

Jun. 23, 2006  (DE) .................. 10 2006 028 868

(51) Int. Cl.
*F02G 3/00* (2006.01)
(52) U.S. Cl. ........................................ 60/620
(58) Field of Classification Search .............. 123/559.1, 123/563, 561; 60/599, 620
See application file for complete search history.

(56) References Cited

U.S. PATENT DOCUMENTS

| | | | |
|---|---|---|---|
| 2,703,560 A | * | 3/1955 | Lieberherr .................. 123/563 |
| 3,483,854 A | * | 12/1969 | Collingwood et al. ....... 123/563 |
| 3,708,979 A | * | 1/1973 | Bush et al. ..................... 60/522 |
| 4,010,613 A | * | 3/1977 | McInerney .................... 60/599 |
| 4,149,370 A | * | 4/1979 | Ayala Vargas ................ 60/39.6 |
| 4,166,438 A | * | 9/1979 | Gottschalk ................ 123/43 R |
| 4,901,531 A | * | 2/1990 | Kubo et al. .................... 60/618 |
| 6,415,607 B1 | * | 7/2002 | Gray, Jr. ........................ 60/616 |
| 7,353,661 B2 | | 4/2008 | Wang et al. |

FOREIGN PATENT DOCUMENTS

| | | | |
|---|---|---|---|
| DE | 167787 | | 1/1906 |
| DE | 34 29 727 | * | 2/1986 |
| DE | 197 45 758 | | 5/1999 |
| JP | 9072255 | | 3/1997 |
| WO | WO 00/71944 | | 11/2000 |
| WO | WO 01/65101 | | 9/2001 |

OTHER PUBLICATIONS

"BMW: Power aus dem Abgas"; Auto Motor Sport, Dec. 8, 2005.

* cited by examiner

*Primary Examiner*—Thomas E Denion
*Assistant Examiner*—Mary A Davis
(74) *Attorney, Agent, or Firm*—Robert Becker; Robert Becker & Assoc

(57) ABSTRACT

A supercharged internal combustion engine of a motor vehicle has a cooling circuit, in which a working medium is recycled, which is conveyed at least partially in a vaporous or gaseous physical state. At least one expander unit is provided which is operatively connected with an output shaft of the internal combustion engine via a power train. Via a conversion of energy contained in the at least partially vaporous or gaseous working medium in the expander unit, an output shaft of the expander unit is moveable. The expander unit is embodied as a two-cycle reciprocating engine, which is operatively connected directly or indirectly via the power train with the output shaft of the internal combustion engine.

17 Claims, 6 Drawing Sheets

SUPERCHARGED INTERNAL COMBUSTION ENGINE WITH AN EXPANDER UNIT IN A HEAT RECOVERY CIRCUIT

BACKGROUND OF THE INVENTION

The present invention relates to a supercharged internal combustion engine of a motor vehicle, which has a cooling circuit, in which a working medium is recycled, which at least partially is conveyed in a vaporous or gaseous physical condition. In this connection, at least one expander unit is provided which is operatively connected with an output shaft of the internal combustion engine, in which the at least partially vaporous or gaseous working medium is expanded and the kinetic energy of the vapor or the gas is converted into kinetic energy.

With the development or further development of internal combustion engines, the main focus of the work recently, on the one hand, has been on the reduction of pollutants and on the other hand, on increasing efficiency of the assembly. In this connection, a possibility exists of increasing the efficiency of modern internal combustion engines by optimally using the heat occurring in the area of the respective internal combustion engine. By providing appropriate features, it is possible to limit the dimensions of the required cooling assembly as well as also make useable the heat loss for other applications in the area of the motor vehicle which otherwise is merely released to the environment. Until now, incidental heat in motor vehicles in the area of the internal combustion engine is used primarily for heating the interior of the vehicle. A problem with this, however, is that the heat required by the vehicle occupants varies, primarily, however, only in exceptional cases with the output provided from the combustion engine. In addition, in particular in the summer months, cooling rather than heating is required, whereby the cooling of the vehicle interior is realized with the aid of a corresponding cooling assembly.

In order to improve engine cooling, recently combustion engines, in particular, vehicle engines, were further developed, such that the corresponding systems enable a use of the incidental heat in the area of the internal combustion engine in the most effective manner. In this connection, on the one hand the possibility exists of using the incidental heat for other heat sinks provided in the vehicle or of converting the heat energy with the aid of corresponding circuit processes into mechanical energy, in particular, kinetic energy.

DE 197 45 758 A1 discloses a cooling assembly for internal combustion engines of motor vehicles, which are to make possible an optimal cooling of the combustion engine using proportionally smaller heat exchanger surfaces. The system described in this reference has an evaporative cooling system, in which the cooling water used, preferably a water-antifreeze passes through a phase transition liquid-vapor-liquid during operation of the cooling system. In this connection, the effect is utilized that the heat transfer coefficients from the warm wall on the boiling liquid as well as from the vapor on the cold wall are higher than with the convection between liquid or gas and one wall. The use of the described evaporative cooling therefore should eventually ensure that heat exchangers can be used with relatively small heat exchanger surfaces compared to common convection heat exchangers. This leads to a substantial minimizing of the space required fro the cooling assembly, in particular the heat exchanger.

In addition to evaporative cooling, in which a substance, primarily water, which is mixed only with an additive for preventing freezing, is used in a coolant circuit, a cooling system for an internal combustion engine is disclosed for example in JP 09072255, which provides two cooling circuits, whereby in one of the two cooing circuits, a two-substance mixture is used as the working medium. In this connection, first incidental excess heat in the area of the internal combustion engine is conducted via a first cooling circuit and with the aid of a heat exchanger, transferred to the working medium supplied in the second cooling circuit. The working medium in the form of the two-substance mixture located in the second cooling circuit is a water-ammonia mixture. This mixture demonstrates in particular that the mixture components have different evaporation temperatures with the same pressure ratios. This type of system offers the advantage that already at a low temperature level, vapor is produced, which is available for a subsequent use.

In the described technical solution, essential components are provided in the second cooling circuit; a generator, in which the ammonia of the water-ammonia mixture is evaporated; a phase separator, in which the liquid phase is separated from the vapor phase; a condenser, in which the ammonia is again fluidized; a choke valve with a downstream evaporator; and finally an absorber, in which the gaseous ammonia is dissolved in water with heat output. In the described cooling system, the heat to be dissipated from the area of the internal combustion engine is transferred in the area of the generator to the water-ammonia mixture and finally used primarily with the help of the condenser for fuel preheating. Also in this case, based on the occurring phase transition, relatively small heat exchanger surfaces are used.

In addition, "BMW Power aus dem Abgas; in Auto Motor Sport from Dec. 8, 2005 (see also internet side http://www.auto-motor-sport.de/d/98231)" discloses a cooling system of a motor vehicle, in which heat energy is removed from exhaust and cooling water, which subsequently is converted in an expander unit into kinetic energy. The expander unit that is used has two steam-axial piston engines, which are coupled via a belt drive with the output shaft of the actual internal combustion engine. Also, this system has two separate cooling circuits for steam production, in which on the one hand water is heated to over 500° C. and on the other hand, ethanol is heated up to 105° C. Both media exist with the above-noted temperatures in the corresponding cooling circuits in the form of superheated steam, which is supplied respectively to one of the two steam-axial piston engines. The kinetic energy stored in the steam is converted in this manner into kinetic energy, which is transferred via the belt drive onto the output shaft of the internal combustion engine in order to achieve an increase in efficiency of the internal combustion engine.

SUMMARY OF THE INVENTION

From the known state of the art, in which in a cooling circuit of an internal combustion engine, first steam is provided and then next, using an expander unit for producing kinetic energy is again expanded, the present invention is based on the object of providing a technical solution, with which the energy conversion in the area of the internal combustion engine is realized using economically sensible components, which require only minimal space. The solution to be provided should hereby have simple constructive structure, in particular, and without substantial expense, be capable of being integrated in the periphery of an internal combustion engine. In addition, it should be noted that the essential structure of an internal combustion engine as well as the arrangement of the mounting assembly must not be changed fundamentally based on the use of an additional expander unit.

According to the present invention, a supercharged internal combustion engine of a motor vehicle is provided, which has a cooling circuit in which a working medium is converted, which is conveyed at least partially in a vaporous or gaseous physical state, whereby at least one expander unit that is connected operatively with an output shaft of the internal combustion engine via a power train is provided. In the expander unit, by means of a conversion from the energy contained in the at least partially vaporous or gaseous working medium, an output shaft of the expander unit is moveable. In addition, the expander unit is embodied as a two-cycle reciprocating engine, preferably as a radial engine, which is connected operatively directly or indirectly via the power train with the output shaft of the internal combustion engine.

In this connection, it is contemplated that the two-cycle reciprocating engine is disposed either within a housing surrounding the internal combustion engine or outside of the internal combustion engine housing. In a very specialized further embodiment of the invention, the two-cycle reciprocating engine is disposed within the housing of the internal combustion engine in the region of the oil pan. In this manner, it is possible to attach the two-cycle reciprocating engine in a particularly space-savings manner in the area of the internal combustion engine.

Based on the embodiment of the expander unit as a radial engine according to the present invention, it is possible to provide a supercharged internal combustion engine, in which the conversion of kinetic energy contained in a working medium into additional kinetic energy in the most compact space is achievable. In this connection, the radial engine is characterized primarily by its radial construction, in particular by the arrangement of the at least two cylinders in one plane, which is arranged advantageously perpendicular to the output shaft of the supercharged internal combustion engine. The vapor producing unit as well as the radial engine preferably is designed, such that a maximum power is achievable on the output shaft of the radial engine of up to 40 kW, with a long-distance commercial vehicle engine. In this connection, the use of a radial engine is suitable, in particular, whose cylinder has an inner diameter of 55 to 65 mm, preferably 60 mm.

With the proposed technical solution according to the present invention, steam is produced at least intermittently in at least one cooling circuit, via which heat from the supercharged internal combustion engine is conducted, preferably from the engine block. The steam is conveyed to the radial engine. There the steam puts the pistons into motion in the individual cylinders and in this manner, also puts an output shaft of the radial engine into rotation. The rotation energy of the output shaft of the radial engine in turn is transferred to the output shaft of the supercharged internal combustion engine. In this connection, it is contemplated to couple the output shafts of the radial engine and the internal combustion engine either directly or indirectly to one another, for example the radial engine is disposed directly on the output shaft of the internal combustion engine, or a direct connection between the output shafts, perhaps via a belt or gear wheel drive or even via a gear, is provided.

In an advantageous embodiment of the invention, the radial engine is provided in the area of a fan wheel of the supercharged internal combustion engine. In this connection, it should be considered that the fan wheel typically is connected operatively with the output shaft, in particular the crankshaft of the internal combustion engine or is disposed directly on it. With the aid of a fan wheel disposed in this manner, normally an air/water heat exchanger and/or the outer wall of the internal combustion engine is impinged with cool air. Advantageously, the radial engine is disposed between a housing of the internal combustion engine, primarily the crankcase, and the fan wheel is disposed so that an extremely space-saving arrangement of an additional expander unit is possible.

A specialized design of the internal combustion engine of the invention contemplates that the output shaft of the internal combustion engine is a crankshaft, with which the radial engine is connected operatively. Advantageously, the radial engine is attached to the output shaft, on which also a fan of the internal combustion engine is provided. With this type of embodiment, therefore, the radial engine and a fan wheel are attached to an output shaft of the internal combustion engine, in particular the crankshaft. In this connection, it is contemplated on the one hand that the output of the radial engine acts directly on the corresponding output shaft of the internal combustion engine or an appropriate gear for example in the form of a sun gear, is interposed.

A further particular embodiment of a supercharged internal combustion engine in contrast has a separate output shaft, on which the radial engine is secured, whereby the output shaft of the radial engine in turn is connected via a gear wheel drive with the output shaft, in particular the crankshaft of the internal combustion engine. An alternative embodiment further contemplates that instead of the gear wheel drive, a belt drive, preferably a cogged belt drive, is disposed between the crankshaft of the engine and the output shaft of the radial engine. Also in this case, it is possible by all means to provide a gear between the output shaft of the radial engine and the crankshaft. For the sake of completeness, it is noted that with the above-described embodiment of the invention, it is immaterial whether the radial engine is arranged with the corresponding working connection with the output shaft of the radial engine and the crankshaft of the internal combustion engine within the crankcase or outside of the crankcase. Nevertheless, attaching of the radial engine as well as the element for creating a working connection between the radial engine and crankshaft of the internal combustion engine outside of the crankcase offers substantial advantages for maintenance as well as for mounting of a drive unit.

The radial engine preferably has at least one intake as well as one discharge valve, which can be regulated as needed with the aid of a cam valve control or corresponding disc valve control. The working medium vapor produced in a vapor production unit is conveyed into the working chamber of the cylinder of the radial engine via a valve mechanism embodied in this manner, so that the piston subsequently executes a linear movement. As soon as the piston has achieved the lower dead center, the discharge of the steam through the discharge valve begins. In a so-called drive mode of the radial engine, the discharge of the steam, the movement of the piston, as well as the discharge of the expanded steam through the discharge valve is repeated in a cyclical sequence, so that the output shaft of the radial engine is put into rotation.

With a specialized embodiment of the invention, as a supplement to the drive mode, it is provided that the radial engine also is convertible in a braking mode. For the design of the braking mode, essentially three alternative technical embodiments are contemplated.

In a first variation of the braking modes the steam is conducted through the cylinder of the radial engine in a reverse order compared to the drive mode, so that the vapor or the gas flows through the cylinder chambers of the individual cylinders in the reverse direction. In this connection, the valves operating in the drive mode as the discharge valve are used as intake valves and the valves operating in the drive mode as intake valves are used as discharge valves. In this manner, the output shaft of the radial engine is in a reverse rotation compared to the drive mode.

A second advantageous technical variation of the braking mode contemplates a variable control of the valves, so that the intake as well as the discharge valves are impinged with vapor or gas depending on the respective operating mode. In a very specialized embodiment in this connection, the opening and closing points or the respective opening and closing time periods are regulated depending on the respective operating mode. With the previously described valve control, therefore, it is possible to conduct vapor or gas into the cylinder chambers of the radial engine, such that the radial engine acts in a braking manner on the crankshaft driven by the supercharged internal combustion engine.

In a third variation of a radial engine according to the present invention, different cams are provided on a camshaft, specifically drive and brake cams, which actuate the valves directly or indirectly. In an advantageous embodiment, the cams are connected operatively with the valves via corresponding driver rods and rocker arms. In this connection, it is contemplated further that the previously mentioned to driver rods are embodied separately, in order to operate in a preferable manner the radial engine in the drive or braking mode.

With a radial engine, which has a braking mode as previously described, it is possible advantageously to slow down the crankshaft of a supercharged internal combustion engine.

The regulation of the vapor supply in the radial engine in order to activate the drive and/or the braking mode is done with the help of a central regulating and control unit. Preferably, such a control and regulating unit is integrated in the central vehicle computer or the internal combustion engine or engine control unit. A further specialized embodiment of the invention contemplates further corresponding sensors within the cooling circuit, in which a working medium is conveyed at least partially in a vaporous or gaseous phase. With the sensors, the pressure, the temperature and/or the vapor or gas content of the working medium is detectable and is transferable to the control and regulating unit.

A very particular design of the radial engine provided on a supercharged internal combustion engine according to the present invention contemplates an actuating mechanism for the intake and discharge valves, which is arranged on the outside of the radial engine and can be placed in a translatory movement with the different slide valves based on the rotation of the output shaft of the radial engine. This translatory movement is initiated, such that the intake and discharge valves of the radial engine are opened and closed as required.

A further advantageous embodiment of the radial engine contemplates that at least three cylinders with the corresponding intake and discharge valves are provided. In this connection, each cylinder preferably has an intake and discharge valve, as previously mentioned. Of course, it also is possible to provide each cylinder with a higher number of intake and/or discharge valves. In this connection, the designation intake or discharge valve relates to the flow direction of the vapor or gas in the drive mode.

In a further specialized design, the radial engine or at least components of the radial engine are made from a temperature-resistance material. In this connection, it is contemplated, especially with regard to the weight of the radial motor, to make the pistons or also other components, such as the valves, drive rods, rocker arms, connecting rod or even the crankshaft of the radial engine from an appropriately resistant plastic.

Next, the invention will be described in greater detail with reference to the accompanying figures.

DETAILED DESCRIPTION OF THE PREFERRED EMBODIMENTS

Figure 1:
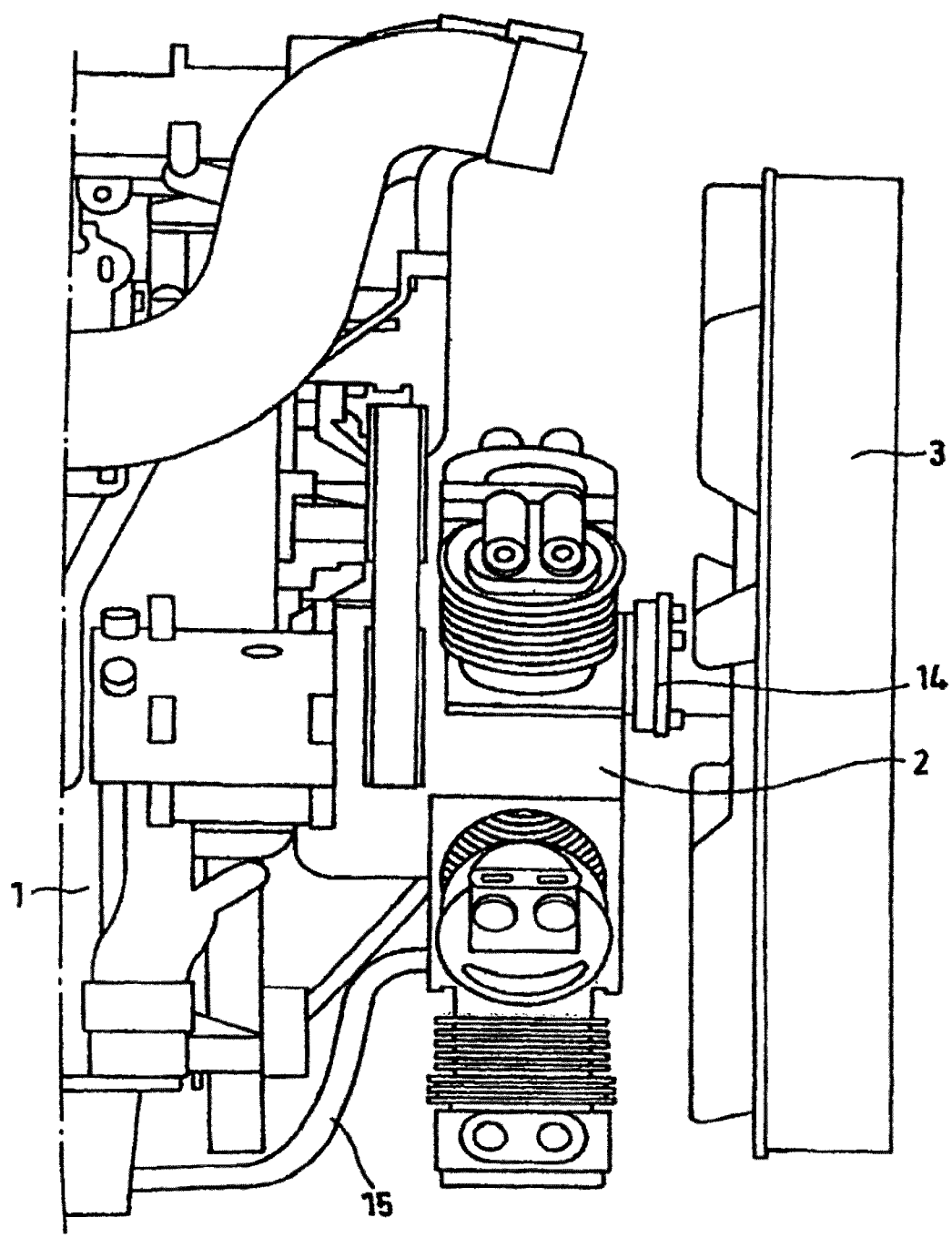
FIG. 1 shows a side view of the installation of an internal combustion engine with an additional radial engine, whose output shaft is coupled with a fan drive shaft arranged within the radial engine crankcase.

FIG. 1 shows in a side view the positioning of an internal combustion engine 1 with a radial engine 2 and a fan wheel 3. Essential with regard to the represented solution is that the radial engine 2 is connected operatively via a power train with an output shaft of the internal combustion engine 1, normally connected with the crankshaft of the internal combustion engine 1. The radial engine 2 is supplied during operation of the internal combustion engine with a working medium vapor that is under pressure, which places the pistons arranged in the cylinders as well as the crankshaft 4 of the radial engine 2 connected with the pistons into motion and in this manner, the vapor is expanded. It is important that the crankshaft 4 of the radial engine 2 is connected operatively with the fan drive shaft 6. In this connection, with the embodiment of a supercharged internal combustion engine 1 according to the present invention as shown in FIGS. 1 and 2, the fan drive shaft 6 is disposed within the crankcase 11 of the radial engine, so that the axial distance between the fan drive shaft 6 and the crankshaft 4 of the radial engine 2 is minimized.

The fan wheel 3 is driven via a fan drive shaft 6 and a cooling air flow during operation of a motor vehicle, with which an air/water heat exchanger and/or the outer wall of the internal combustion engine is cooled. The fan drive shaft 6 is connected via gear wheel drive (see FIGS. 2, position 8) with the crankshaft (not shown) of the internal combustion engine 1. The mounting of the radial engine to the crankcase of the internal combustion engine 1 takes place with the aid of the radial engine flange 5, whereby the radial engine flange 5 has corresponding recesses 7, in which screws are insertable, which subsequently are screwed into the crankcase.

Figure 2:
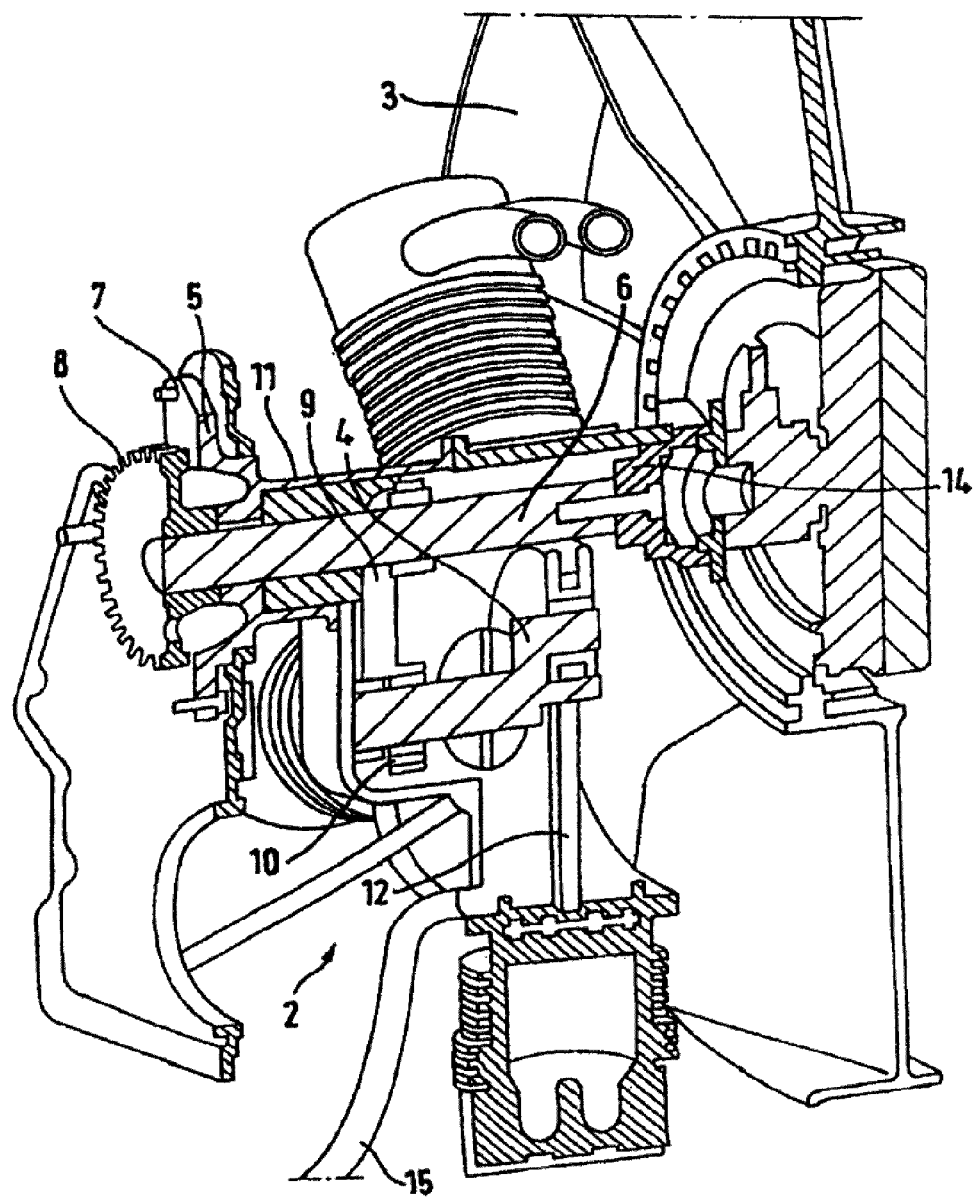
FIG. 2 shows a sectional view of a radial engine, whose output shaft is coupled with a fan drive shaft arranged within the radial engine crankcase.

FIG. 2 shows a sectional representation of a radial engine 2 provided in addition to an internal combustion engine 1. The crankshaft 4 of the radial engine 2 is connected directly via the fan drive shaft 6 with the crankshaft of the internal combustion engine. In this connection, a chain drive 9 creates the working connection between the crankshaft 4 of the radial engine 2 and the fan drive shaft 6 and the gear wheel drive 8 mentioned above creates a corresponding connection between the fan drive shaft 6 and the crankshaft of the internal combustion engine 1. It is important with regard to the integration of an additional radial engine 2 in the power train of an internal combustion engine 1 as shown in FIG. 2 that the operation of the fan wheel 3 and the expander unit formed as a radial engine 2 can take place independently from one another. For this purpose, a coupling or clutch 10 is provided between the chain drive 9 and the crankshaft 4 of the radial engine 2, through whose actuation, the crankshaft 4 of the radial engine 2 and the fan drive shaft 6 selectively are couplable or uncouplable. In this manner, in can be ensured in particular that instead of providing an additional vapor circuit with the radial engine 2 in each operating point of the internal combustion engine 1, a reliable cooling of the drive unit takes place. In addition, also in dynamic operating phases of the internal combustion engine 1, for example with continuous acceleration processes of the driven vehicle, the internal combustion engine 1 will not drive the radial engine 2, although the additionally provided vapor circuit reacts relatively inactively with the radial engine 2.

In connection with the embodiment shown in FIG. 2, the clutch 10 is embodied as a so-called freewheel clutch (also overriding clutch). In this case, the freewheel has a clamping body, which ensures that the rotational movement of the fan drive shaft 6 and the crankshaft 4 of the radial engine are uncoupled as soon as the load ratio changes.

In addition, with the embodiment described in connection with FIG. 2, it is provided that the radial engine is driven in the drive mode as well as in the braking mode. For this reason, the freewheel is embodied to be lockable, so that by reversing the valve, operation in the drive mode as well as in the braking mode can be possible As already mentioned above, the output shaft 4 of the radial engine 2 connected via a chain drive 9 and the fan drive shaft 6 are disposed in the crankcase 11 of the radial engine 2. The through drive of the fan drive wheel 6 to the fan wheel 3 takes place in this connection through the crankcase 11 in an area located between the two connecting rods 12 of the radial engine 2 in this manner, the axial distance between the fan drive shaft 6 and the crankshaft 4 of the radial engine 2 is maintained relatively small.

The intake as well as the discharge valves of the radial engine 2 are in the form of seat valves, which permits a high impermeability in the closed position. The actuation of the intake and discharge valves takes place with the aid of cam discs, which are provided on the crankshaft 4 of the radial engine 2.

With the described design of a vapor-driven radial engine 2, the air drive shaft 6 is operated with a higher rotary speed than the crankshaft of the internal combustion engine. Based on the high operating rotary speed of the fan drive shaft 6, it is thereby possible to design the radial engine with a relatively small cubic capacity, since the crankshaft 4 of the radial engine 2 is operated in a rotary speed range that is at least similar to the operating rotary speed of the fan drive shaft 6.

In addition, the arrangement of the radial engine directly behind the fan wheel 3 or between the fan wheel 3 and the internal combustion engine 2 offers a very space-saving arrangement possibility for the additional expander unit.

The supplying of the vapor from the vapor production unit (not shown) to the valves takes place via working medium lines 15, which preferably are embodied as flexible tubes.

Figure 3:
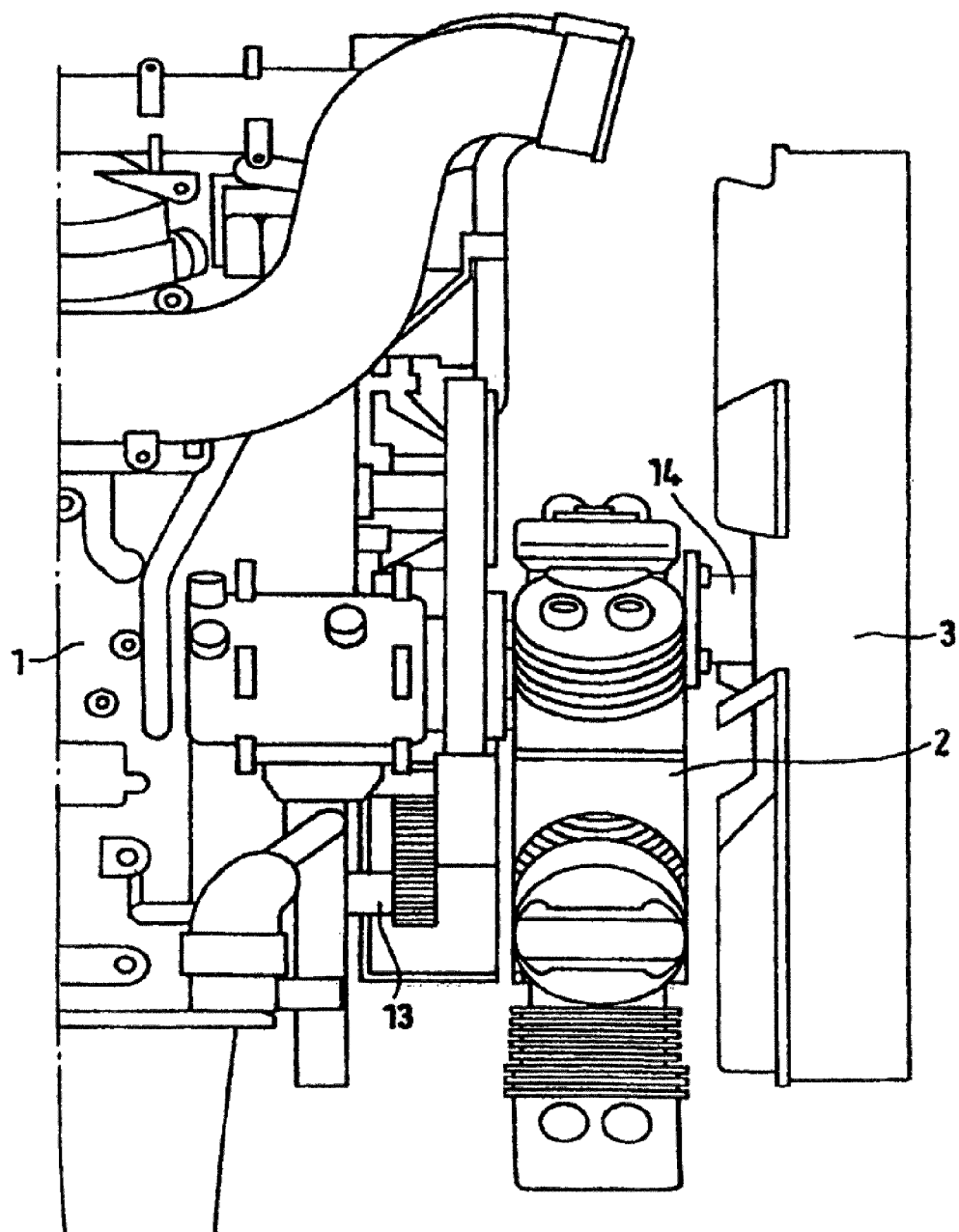
FIG. 3 shows a side view of the installation of an internal combustion engine with an additional radial engine, whose output shaft is coupled with a shaft arranged outside of the fan drive shaft of the radial engine crankcase, which is operatively connected with the internal combustion engine.

FIG. 3 shows first the installation of an additionally provided, vapor-driven radial engine 2 on an internal combustion engine 1. In contrast to the embodiment described in connection with FIGS. 1 and 2, the fan drive shaft 6 is disposed outside of the crankcase of the radial engine. The fan drive shaft 6 runs outside of the crankcase between two cylinders of the radial engine 2 to the fan wheel 3 and is connected operatively with the crankshaft of the internal combustion engine 1 on the side opposite the fan wheel via a gear wheel drive.

Figure 4:
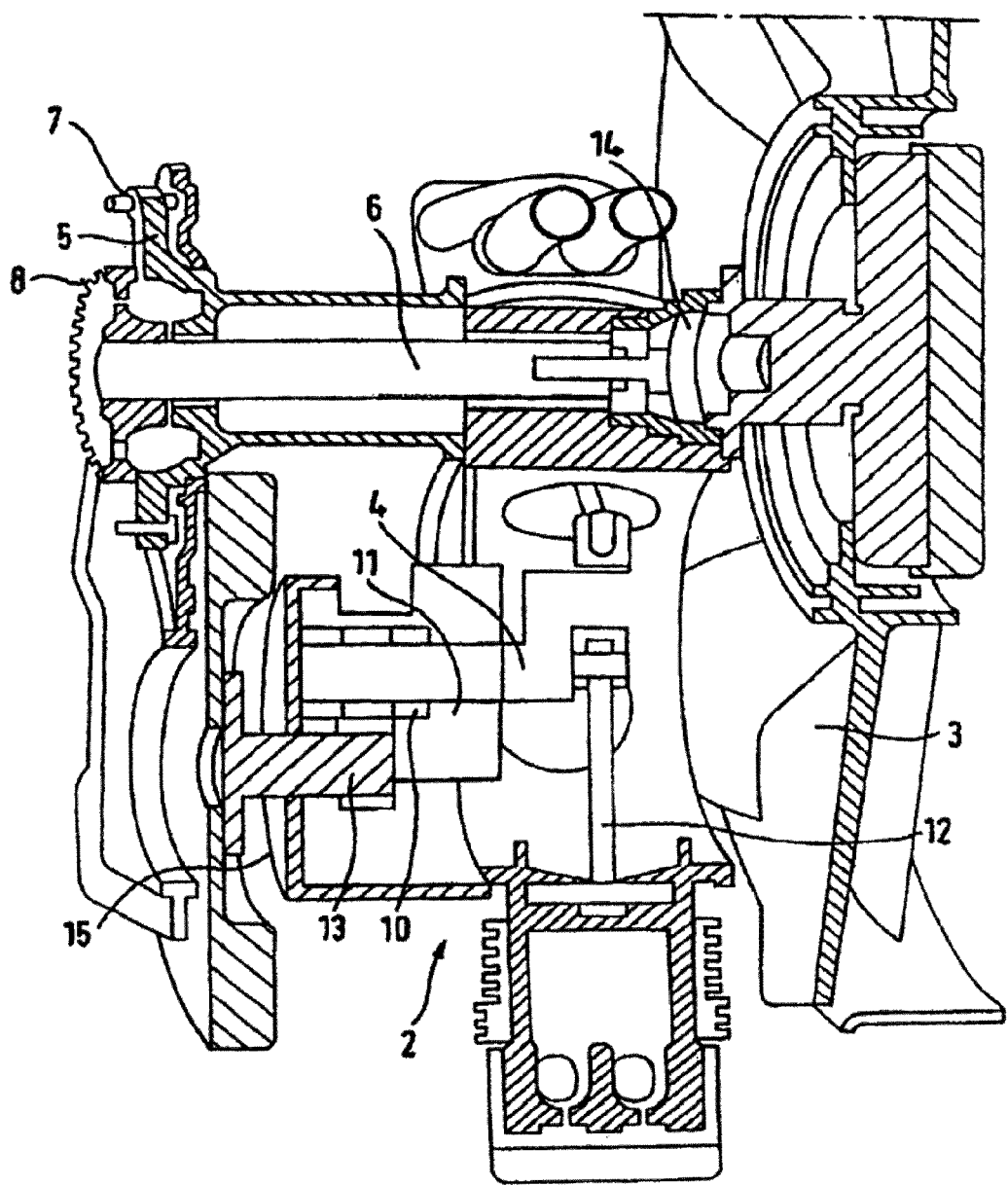
FIG. 4 shows a sectional view of a radial engine, whose output shaft is coupled with a shaft arranged outside of the radial engine crankcase, which is operatively connected with the internal combustion engine.

In FIG. 4, a sectional representation of the installed radial engine shown in FIG. 3 is represented. In this case, the crankshaft 4 of the radial engine 2 is coupled via a spur gear step 13 and a corresponding flange connection with the crankshaft of the internal combustion engine 1. Depending on the placement of the spur gears used for the spur gear step 13 the spur gear step 13 also can be embodied as a step-up spur gear. In addition, a freewheel, which equalizes the varying difference in rotary speed between the crankshaft 4 of the radial engine and the crankshaft of the internal combustion engine as a function of the load ratio is integrated directly in the spur gear step.

The intake and discharge valves of the cylinder of the radial engine 2 in turn are embodied as seat valves, which are actuated by cam discs arranged on the crankshaft 4 of the radial engine 2. The embodiment shown in FIGS. 3 and 4 of a supercharged internal combustion engine with an additional radial engine offers the advantage that with the external fan drive shaft 6, the radial engine 2 itself can be designed to be smaller. In addition, with this constructive design, the fan coupling 14 can be flange-mounted in the area of the fan wheel 3 between two cylinders of the radial engine 2. In this manner, the fan wheel 3 is disposed directly in front of the radial engine 2.

Figure 5:
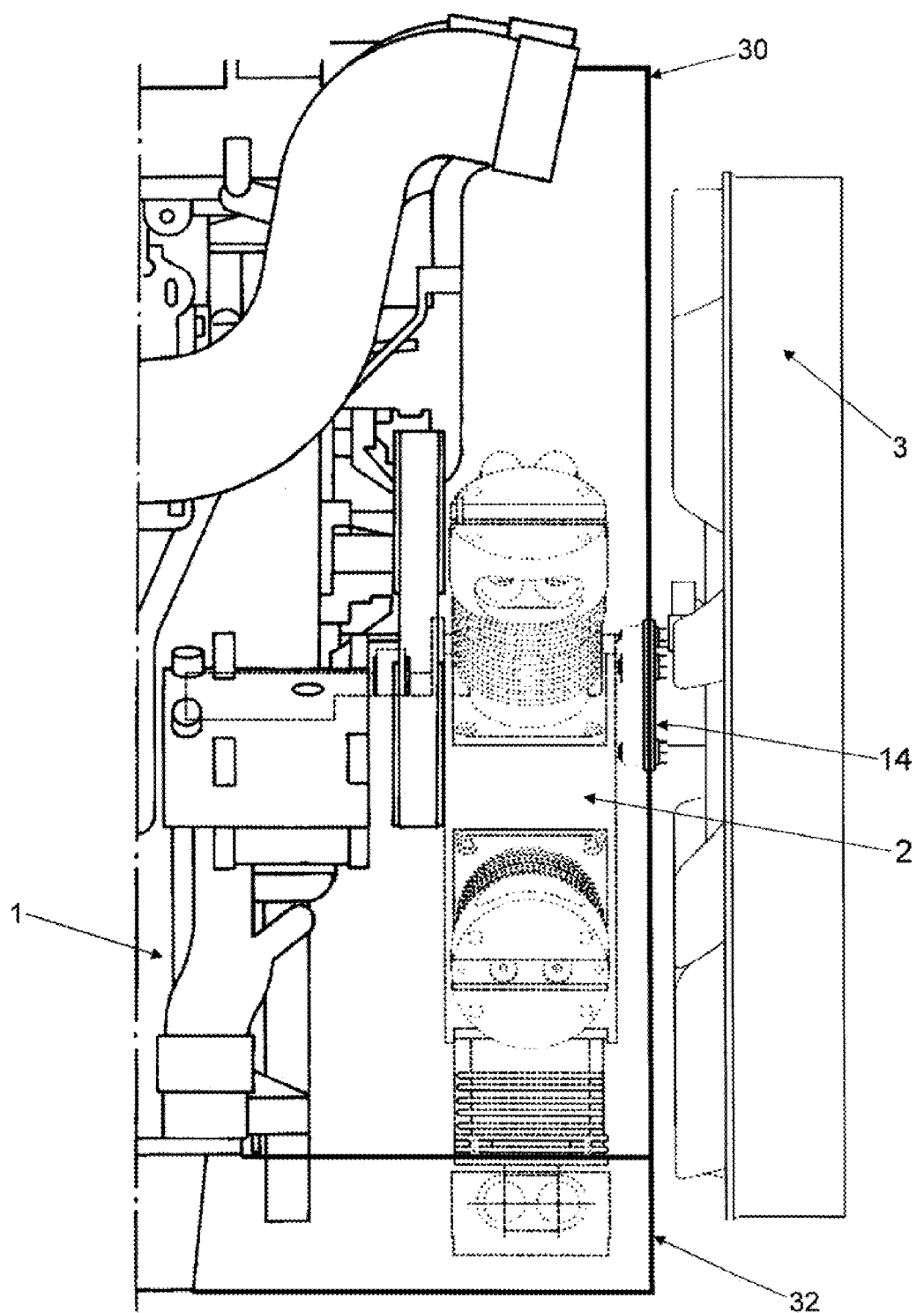
FIG. 5 shows the two-cycle reciprocating engine disposed within a housing surrounding the internal combustion engine and within an oil pan of the internal combustion engine.

FIG. 5 shows the two-cycle reciprocating engine disposed within a housing 30 surrounding the internal combustion engine and within an oil pan 32 of the internal combustion engine.

Figure 6:
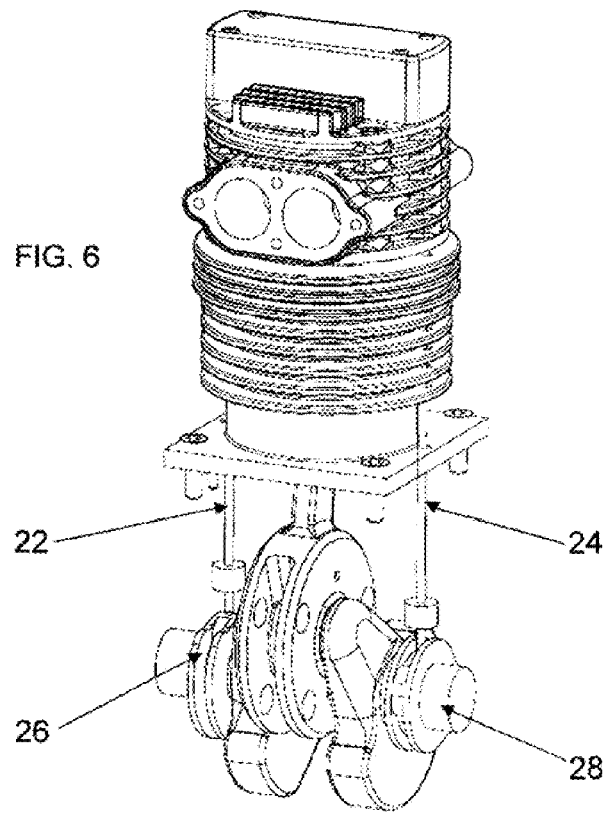
FIG. 6 show the radial engine according to the present invention, in which different cams are provided on a camshaft.
Figure 7A:
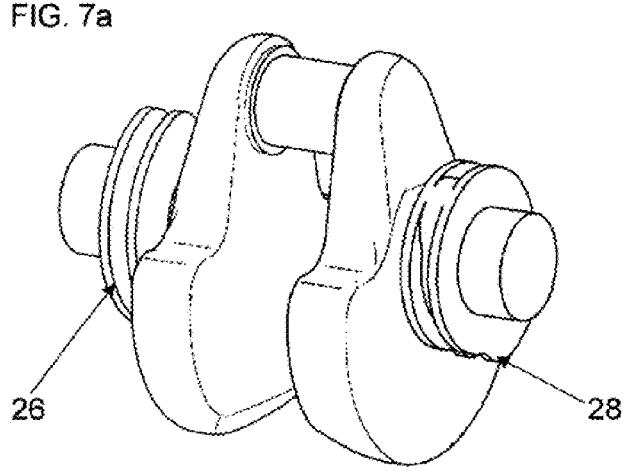
FIGS. 7a and 7b are detailed views of the cams of FIG. 6.
Figure 7B:
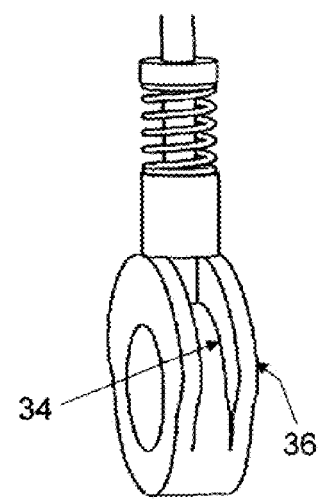

FIGS. 6, 7a, and 7b show the radial engine 2 according to the present invention, in which different cams 26, 28 are provided on a camshaft, specifically drive 34 and brake cams 36, which actuate the valves 22, 24 directly or indirectly. In an advantageous embodiment, the cams 26, 28 are connected operatively with the valves 22, 24 via corresponding driver rods and rocker arms. In this connection, it is contemplated further that the previously mentioned two driver rods are embodied separately, in order to operate in a preferable manner the radial engine 2 in the drive or braking mode.

The invention claimed is:

1. A supercharged internal combustion engine of a motor vehicle, comprising:
   a cooling circuit, wherein a working medium is circulated in the cooling circuit, wherein the working medium is conveyed in both a liquid and a vaporous or gaseous physical state;
   at least one expander unit operatively connected with an output shaft of the internal combustion engine via a power train, in which through a conversion of energy contained in the at least partially vaporous or gaseous working medium, an output shaft of the expander unit is moveable, wherein the expander unit is embodied as a two-cycle reciprocating engine, which is operatively connected directly or indirectly via the power train with the output shaft of the internal combustion engine; and
   a fan wheel having a fan drive shaft, wherein said fan wheel and said two-cycle reciprocating engine are configured to operate independently from one another;
   a clutch configured to selectively couple and decouple the fan drive shaft and a crankshaft of said two-cycle reciprocating engine;
   wherein the two-cycle reciprocating engine is disposed in a region located between the internal combustion engine and the fan wheel.

2. The supercharged internal combustion engine according to claim 1, wherein the two-cycle reciprocating engine is disposed within a housing surrounding the internal combustion engine.

3. The supercharged internal combustion engine according to claim 1, wherein the two-cycle reciprocating engine is disposed within an oil pan of the internal combustion engine.

4. The supercharged internal combustion engine according to claim 1, wherein the two-cycle reciprocating engine is embodied as a radial engine.

5. The supercharged internal combustion engine according to claim 1, wherein the two-cycle reciprocating engine is disposed outside of a housing surrounding the internal combustion engine in a region located between the internal combustion engine and the fan wheel.

6. The supercharged internal combustion engine according to claim 1, wherein the power train includes the crankshaft of the two-cycle reciprocating engine and the fan wheel, which are connected operatively with one another.

7. The supercharged internal combustion engine according to claim 1, wherein the power train has at least one gear wheel, and wherein the two-cycle reciprocating engine is operatively connected directly or indirectly via the at least one gear wheel with the output shaft of the internal combustion engine.

8. The supercharged internal combustion engine according to claim 1, and wherein the power train has at least one belt drive or chain drive, and wherein the two-cycle reciprocating engine is operatively connected directly or indirectly via the at least one belt drive or chain drive with the output shaft of the internal combustion engine.

9. The supercharged internal combustion engine according to claim 1 wherein the two-cycle reciprocating engine has at least one cylinder with intake and discharge valves, and wherein the valves are embodied such that a flow direction of the working medium is reversible by the cylinder.

10. The supercharged internal combustion engine according to claim 1 wherein the two-cycle reciprocating engine has at least one cylinder with intake and discharge valves, and wherein said valves are controllable via a valve control.

11. The supercharged internal combustion engine according to claim 1, wherein the two-cycle reciprocating engine has at least one cylinder with intake and discharge valves, and wherein said valves are operable by means of a camshaft that is operatively connected with the crankshaft embodied as the output shaft of the two-cycle reciprocating engine.

12. The supercharged internal combustion engine according to claim 11, wherein the camshaft has at least one drive cam and a brake cam.

13. The supercharged internal combustion engine according to claim 1, wherein the fan drive shaft is disposed within a housing of the two-cycle reciprocating engine.

14. The supercharged internal combustion engine according to claim 1, wherein the fan drive shaft is arranged outside of a housing of the two-cycle reciprocating engine.

15. The supercharged internal combustion engine according to claim 1, wherein the power train has a crankshaft embodied as the output shaft of the two-cycle reciprocating engine, a chain drive that connects the power train crankshaft with the fan drive shaft, and a gear drive that connects the fan drive shaft with the output shaft of the internal combustion engine.

16. A supercharged internal combustion engine of a motor vehicle, comprising:
    a cooling circuit, wherein a working medium is circulated in the cooling circuit, wherein the working medium is conveyed in both a liquid and a vaporous or gaseous physical state;
    at least one expander unit operatively connected with an output shaft of the internal combustion engine via a power train, in which through a conversion of energy contained in the at least partially vaporous or gaseous working medium, an output shaft of the expander unit is moveable, wherein the expander unit is embodied as a two-cycle reciprocating engine, which is operatively connected directly or indirectly via the power train with the output shaft of the internal combustion engine, wherein the power train has at least one power train clutch disposed between the internal combustion engine and the reciprocating engine; and
    a fan wheel having a fan drive shaft, wherein said fan wheel and said two-cycle reciprocating engine are configured to operate independently from one another;
    a fan clutch configured to selectively couple and decouple the fan drive shaft and a crankshaft of said two-cycle reciprocating engine.

17. The supercharged internal combustion engine according to claim 16, wherein the at least one power train clutch is an overriding clutch.

* * * * *

UNITED STATES PATENT AND TRADEMARK OFFICE
CERTIFICATE OF CORRECTION

| | | |
|---|---|---|
| PATENT NO. | : 7,845,171 B2 | Page 1 of 1 |
| APPLICATION NO. | : 11/765646 | |
| DATED | : December 7, 2010 | |
| INVENTOR(S) | : Heribert Möller and Gottfried Raab | |

It is certified that error appears in the above-identified patent and that said Letters Patent is hereby corrected as shown below:

On the Title Page Item (75)
The second inventor's surname name has been incorrectly spelled "Raah". The correct spelling of his surname is Raab.

Signed and Sealed this
Twenty-fifth Day of January, 2011

David J. Kappos
*Director of the United States Patent and Trademark Office*